United States Patent [19]
Hill

[11] 3,837,904
[45] Sept. 24, 1974

[54] METHOD OF SIZING CARBON FIBERS
[75] Inventor: James Edward Hill, Johnson City, Tenn.
[73] Assignee: Great Lakes Carbon Corporation, New York, N.Y.
[22] Filed: Feb. 29, 1972
[21] Appl. No.: 230,447

Related U.S. Application Data
[63] Continuation-in-part of Ser. No. 17,928, March 9, 1970, abandoned.

[52] U.S. Cl. .................. 117/139.5A, 117/161UD, 117/161ZB, 117/161 K
[51] Int. Cl. ............................................. C08j 1/44
[58] Field of Search ...... 117/139.5 A, 228, 161 UD, 117/161 ZB, 161 K, 161 P, 47 CB, DIG. 11; 423/447; 260/837 R, 845, 852

[56] References Cited
UNITED STATES PATENTS

| | | | |
|---|---|---|---|
| 2,879,252 | 3/1959 | Been et al. | 260/837 R |
| 3,406,126 | 10/1968 | Litant | 252/511 |
| 3,574,665 | 4/1971 | Basche | 117/64 R |
| 3,677,804 | 7/1972 | Kalnin et al. | 117/228 |
| 3,723,157 | 3/1973 | Druin | 117/46 CB |

*Primary Examiner*—William D. Martin
*Assistant Examiner*—Theodore G. Davis
*Attorney, Agent, or Firm*—Donald R. Cassady

[57] ABSTRACT

A method for sizing carbon fibers to improve handleability and strand strength of yarns, rovings, tapes, tows with a size, comprising a resin such as an epoxide, a polyimide, a polyamide or a polyester and a reactive functionally terminated polymer dissolved therein which percipitates therefrom when the resin is subjected to a curing temperature. Examples of reactive functionally-terminated polymer include carboxyterminated butadiene/acrylonitrile copolymer, mercaptan-terminated butadiene/acrylonitile copolymer, and other relatively low molecular weight polymers with reactive end-groups such as hydroxyl, carboxy and thiol.

9 Claims, No Drawings

3,837,904

METHOD OF SIZING CARBON FIBERS

CROSS-REFERENCE TO RELATED APPLICATIONS

This application is a continuation-in-part of copending application Ser. No. 17,928, filed Mar. 9, 1970, and now abandoned.

BACKGROUND OF THE INVENTION

Composite materials, for use in the aerospace industry, are well-known to the art. Such materials comprise a resinous binder, as for example a polymerized epoxide and a filler, as for example asbestos, glass fibers, or carbon fibers.

Of the above named fillers, carbon fibers have received attention due to their high corrosion and temperature resistance, low density, high tensile strength and high modulus of elasticity.

Uses for such carbon-fiber reinforced composites include aerospace structural components, rocket motor casings, deep submergence vehicles, and ablative materials for heat shields on re-entry vehicles.

The incorporation of carbon or graphite particles in resin bases in amounts of up to 60 percent by volume will impart a heat-conducting property but not an electrical conductivity to the component. Litant, in U.S. Pat. No. 3,406,126, teaches the addition of carbon yarn in as little as 0.05 percent by volume to the resinous matrix to impart electrical conductivity to the resulting composite. Such composites can be prepared from polyesters, polyvinyl chloride, polyepoxides, or like resins, and carbonized rayon, polyacrylonitrile, or like fibers.

High modulus composites usually have low shear strengths parallel to the direction of the fibers of about 3,000 to 4,000 psi. These low shear strengths are probably due to poor bonding between the carbon fibers and the matrix. Attempts to improve this bonding, particularly between rayon-based carbon fiber fillers and an epoxy-matrix have been partially successful, but have resulted in a degradation of the ultimate tensile strength of the fiber and also of the fabricated composite.

Improved bonding has been accomplished by plating the fiber with various metals, as for example tantalum, with metal carbides, as for example whiskers of silicon carbide, and with nitrides.

More recently, carbon fibers have been treated with various oxidizing agents in order to etch the surface of the fiber. Such oxidizing agents have included air, ozone, concentrated nitric acid, and chromic-sulfuric acid. In most cases the oxidative treatment of rayon-based carbon fibers resulted in a decrease in ultimate tensile strength of the fiber and of the fiber-resin composite.

The primary structural properties of fiber-resin composites improve as carbon fiber content is increased up to about 65 volume percent then decreases as the fiber content exceeds that aforementioned figure. The preferred range of carbon fiber content is about 45 to 65 volume percent of fiber in the fabricated composite.

OBJECTS OF THE INVENTION

It is an object of this invention to provide a carbon fiber with superior properties for use in resin-based composites.

It is a further object to provide a superior carbon fiber for use in composites, which composites possess superior primary structural properties and are heat and electrical conducting.

A further object of this invention is to provide a carbon fiber of improved handleability and yarn strand strength.

SUMMARY OF THE INVENTION

The objects of this invention are achieved by contacting a high-modulus carbon fiber with a resin containing from about 5 to about 60 volume percent of a reactive functionally terminated polymer therein and curing the resulting resinous sizing. Such resinous-sizing material should be compatible with the matrix resin of the composite for which the carbon fiber is intended. The reactive functionally terminated polymer separates from the sizing resin in discrete particulate matter upon curing the sizing resin, improving the handleability and primary structural properties of the yarns, tapes, rovings, and tows comprising these fibers and the primary structural properties of composites made therefrom.

DETAILED DESCRIPTION OF THE INVENTION

In the first instance, this invention provides for a coated carbon fiber and method for its manufacture. In the second instance, this invention provides for a composite comprising a resinous material and the above coated carbon fiber.

High modulus acrylic-based carbon fibers useful for this invention are defined as those fibers possessing a tensile strength of greater than $100 \times 10^3$ psi and a Young's modulus greater than $20 \times 10^6$ psi. Such fibers can be prepared by the method of Shindo, "Studies in Graphite Fiber Report No. 317 of the Government Research Industrial Institute," Osaka, Japan, 1961, and Tsunoda, U.S. Pat. No. 3,285,696. Typically, acrylic-fibers can be stretched to about 50 to 100 percent or more of their original length while heating in the presence of water or steam to about 100°C., oxidized in an oxidizing atmosphere at about 200° to 300°C. for a period of up to 4 hours, oxidized in a second stage in an oxidative atmosphere at 200° to 375°C. and pyrolyzed and/or graphitized at 1,000° to 3,000°C. in a non-oxidizing atmosphere to prepare a carbon fiber possessing a high modulus of elasticity and a high tensile strength.

By the process of this invention, carbon fibers are coated with a sizing solution comprising about 5 to about 60 volume percent of a reactive functionally terminated polymer in a resinous sizing material. The resinous sizing material must be compatible with the resin matrix of the composite for which the carbon fiber is intended. For this purpose it is preferred to use the same resin for the composite matrix and the resinous sizing material.

By reactive functionally-terminated polymer is meant a polymeric material, of linear or cross-linked variety, the chain terminating portions thereof consisting of reactive functional groups. The polymer precipitates from a solution of from about 5 to about 60 volume percent of the reactive functionally terminated polymer in the resinous size when the solution is subjected to a curing temperature.

The sizing resins of this invention can be applied either with or without an added solvent. It is obvious to one skilled in the art that the presence of a solvent will improve the penetrability of the sizing material onto the individual fibers of a staple yarn or roving. When sizing a monofilament or tow material, the solvent is usually not necessary so long as the resin solution is sufficiently fluid and properly wets the surface of the carbon fiber. Ketonic solvents are preferred solvents for the resin system. Such ketonic solvents can include acetone, methyl ethyl ketone, methyl isobutyl ketone, 3-pentanone, and the like.

Curing temperatures, the temperature at which the sizing resin becomes substantially cross-linked, varies with the resin used. Epoxy resins typically cure at about 60° to 200°C.; polyimides typically cure at about 300°C.; polyesters typically cure at about 50° to 150°C.; and polyamides typically are molded at about 250°C. During the curing process, it is critical to this invention that the reactive functionally terminated polymer solute separate from the sizing resin in discrete particles of at least 1,000A or greater diameter in order to realize the objects of this invention.

The sizing resin of this invention can be applied to carbon fibers as for example those prepared by the above-exemplified method or to the same carbon fibers after they have been surface treated in such a manner as to etch or pit the surface. Methods of etching or pitting the surface have been disclosed by J. W. Johnson in Belgian Pat. No. 708,651 and by K. Miyamichi et al. in Japanese Pat. No. 8995/68. These include treatment with oxygen, ozone, nitric acid, chromic acid, and the like.

Resins useful to prepare the matrix of the composites of this invention include epoxide, polyimide, polyamide, polyester, crystalline or amorphous poly-lower alkylene, and "Friedel-Crafts" type resins. By "Friedel-Crafts" type resin is meant a resin formed from an aromatic compound with an aromatic linking agent which has two groups, such as methoxymethyl or chloromethyl, attached to the aromatic nucleus, by means of a polycondensation reaction involving the nuclear hydrogen atoms, Trans. and J. of the Plastics Inst. (London) 32; No. 101, pp. 298–302 (1964).

Examples of a reactive functionally terminated polymer include carboxy-terminated butadiene/acrylonitrile copolymer, mercaptanterminated butadiene/acrylonitrile copolymer, and other relatively low molecular weight polymers with reactive end-groups such as hydroxyl, carboxyl, thiol, and the like.

The following examples are given to further illustrate the method of this invention:

EXAMPLE 1

A skein of chromic/sulfur acid surface treated carbon yarn made from polyacrylonitrile fiber is contacted with a solution of 1.5 g. of carboxy-terminated butadiene/acrylonitrile copolymer, Hycar CTBN (B. F. Goodrich Company), 25 g. of epoxy resin, Epon 826 (Shell Oil Company), and 3.5 g. of meta-phenylenediamine, in 2 liters of methyl ethyl ketone. The coated skein is air dried and the size is cured by placing the yarn in a force air oven at 125°C. for 30 minutes.

EXAMPLE 2

The method of Example 1 is followed except that 2.25 g. of Hycar CTBN are used.

EXAMPLE 3

The method of Example 1 is followed except that 24 g. of Hycar CTBN and 25 g. of Epon 826 are used.

EXAMPLE 4

The method of Example 1 is followed except that nonsurface-treated carbon fiber from polyacrylonitrile yarn is used.

The fiber treated by the above or equivalent methods possesses superior handleability as noted by a decreased fuzzing and an increased abrasion resistance. The fibers also possess a good flexibility and strand strength in winding and rewinding operations.

The resin sized carbon fiber of this invention is incorporated in amounts of about 45 to about 65 percent by volume in a resin and polymerized in a manner well known in the art to give a void free composite. Exemplification of this method has been provided by Rees, U.S. Pat. No. 3,276,931, and Warner, U.S. Pat. No. 3,281,300.

The physical properties of the prepared composite including tensile, compression, and shear strength are measured by methods also well known in the art. More specifically, in order to prepare test composites, the fiber is wound onto a 7 inch diameter drum which drum contains an exterior 0.005 inch Teflon sheet coating. A transverse guide is driven at a constant rate based on yarn diameter to provide parallel alignment of the yarn without voids or overlap of the fibers. While winding, a solution of 38 weight percent epoxy resin (Shell Epon 826), 12 weight percent meta-phenylenediamine (E. I. du Pont de Nemours), and 50 weight percent anhydrous methyl ethyl ketone in an amount 2 – 2 ½ times that required for the composite is added to the winding and the mandrel is heated to provide a surface temperature of 75°C. in order to effect a precure or B-stage in the resin system and evaporate the excess solvent. The additional material is provided to permit adequate flow and bleed-out. Winding is continued until a single layer of composite has been accumulated on the drum. The resulting composite is cut transversely, pulled from the drum, and spread flat on Teflon sheeting to provide a B-stage tape. Such tape is cut into appropriately dimensioned segments and the segments are stacked into a Teflonlined mold, aligning the fibers, until an amount needed to form a 0.12 inch thick composite bar has been accumulated. The mold containing the stacked tapes is placed in a heated-platen press, held under a pressure of 5 millimeters of mercury for one hour, then heated at 100°C. for 2 hours under a pressure of 300 psig. and at 200°C. for one hour under the same pressure to effect cure.

The cured composite is tested for flexural strength, flexural modulus, tensile strength, tensile modulus, volume percent of fiber, shear strength, and density. A sample composite bar is loaded in a three-point configuration on a 2 inch span (the supports and loading surfaces being radial faces of 0.5 inch diameter steel pins). Stress is applied until failure, giving a linear stress-strain curve from which the flexural strength and flexural modulus of the composite can be calculated. A second sample of the composite is loaded in a three-point configuration on 0.4 inch centers consisting of the radial surfaces of 0.375 inch diameter steel pins, providing a length to depth ratio of 3.3:1. The bar is flexed to failure. Depending upon the tensile properties of the reinforcing yarn and the quality of the resin matrix to graphite yarn interfacial bonding, three predominate modes of failure are noted. A transverse (tensile) failure showing a sharp peak in the stress-strain curve at the failure point results from high shear properties in conjunction with relatively lower tensile strength properties of the yarn. Shear strength values obtained with transverse failure of this type are not true indications of shear strength but are minimum values since the tensile strength of the bar failed before a true shear failure value is attained. Low shear strength bars fail parallel to the long dimension of the sample. Complex failures consisting of a combination of the above two types are obtained in samples of intermediate shear strength.

Composite flexural strength and modulus, and shear strength parallel to the line of fibers is superior in composites containing the sized fibers of this invention.

What I claim is:

1. A method of sizing carbon fibers which comprises coating the fibers with a heat curable resin containing a reactive functionally terminated polymer and subjecting the resinous size to curing temperatures wherein the reactive functionally terminated polymer separates in discrete particles of at least 1,000 A in diameter.

2. A method of claim 1 wherein the reactive functionally terminated polymer is mercaptan-terminated butadiene/acrylonitrile copolymer.

3. The method of claim 2 wherein the resin is an epoxy resin.

4. The method of claim 1 wherein the reactive functionally terminated polymer is carboxy-terminated butadiene/acrylonitrile copolymer.

5. The method of claim 4 wherein the resin is an epoxy resin.

6. A method of improving the strand strength and handleability of carbon fibers which comprises sizing the fibers with a heat curable resin containing discrete particles of a reactive functionally terminated polymer therewith.

7. The method of claim 6 wherein the descrete particles of reactive functionally terminated polymer are at least 1,000 A in diameter.

8. The method of claim 6 wherein the discrete particles of reactive functionally terminated polymer are mercaptan-terminated butadiene/acrylonitrile copolymer.

9. The method of claim 6 wherein the discrete particles of reactive functionally terminated polymer are carboxy-terminated butadiene/acrylonitrile copolymer.

* * * * *